United States Patent
Wiberg et al.

(10) Patent No.: US 10,225,048 B2
(45) Date of Patent: Mar. 5, 2019

(54) ADAPTIVE HARQ TIMING RELAXATION

(71) Applicant: Telefonaktiebolaget LM Ericsson (publ), Stockholm (SE)

(72) Inventors: Niclas Wiberg, Linköping (SE); Martin Hessler, Linköping (SE); Christian Skärby, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 14 days.

(21) Appl. No.: 15/522,227

(22) PCT Filed: Nov. 5, 2014

(86) PCT No.: PCT/SE2014/051306
§ 371 (c)(1),
(2) Date: Apr. 26, 2017

(87) PCT Pub. No.: WO2016/072892
PCT Pub. Date: May 12, 2016

(65) Prior Publication Data
US 2017/0317791 A1    Nov. 2, 2017

(51) Int. Cl.
*H04L 1/18*    (2006.01)
*H04L 1/20*    (2006.01)

(52) U.S. Cl.
CPC .......... *H04L 1/1825* (2013.01); *H04L 1/1861* (2013.01); *H04L 1/1887* (2013.01); *H04L 1/1812* (2013.01); *H04L 1/20* (2013.01)

(58) Field of Classification Search
CPC ... H04L 1/1825; H04L 1/1861; H04L 1/1887; H04L 1/1854
See application file for complete search history.

(56) References Cited

U.S. PATENT DOCUMENTS

| | | | |
|---|---|---|---|
| 8,031,583 B2 * | 10/2011 | Classon | H04L 1/1822 370/208 |
| 2004/0179480 A1 | 9/2004 | Attar et al. | |
| 2010/0281322 A1 * | 11/2010 | Park | H04L 1/0001 714/748 |

(Continued)

FOREIGN PATENT DOCUMENTS

| | | |
|---|---|---|
| EP | 1 686 743 | 8/2006 |
| EP | 2 061 175 | 5/2009 |

(Continued)

OTHER PUBLICATIONS

International Search Report for International application No. PCT/SE2014/051306—dated Oct. 1, 2015.

(Continued)

*Primary Examiner* — Jamal Javaid
(74) *Attorney, Agent, or Firm* — Sage Patent Group

(57) ABSTRACT

The present disclosure is directed to a method and apparatus for controlling a Hybrid Automatic Repeat Request, HARQ, retransmission round-trip time for transmission in a wireless network. The method comprises to estimate (S41) one or more latency related transmission parameters and to select (S43) one or more of a plurality of predefined HARQ relaxation techniques based on the estimated one or more latency related transmission parameters. Transmission is scheduled (S44) using the selected one or more HARQ relaxation technique.

18 Claims, 8 Drawing Sheets

(56) References Cited

U.S. PATENT DOCUMENTS

2011/0090825 A1\* 4/2011 Papasakellariou ........ H04L 1/06
370/280

FOREIGN PATENT DOCUMENTS

| WO | 2010 105702 A2 | 9/2010 |
| WO | 2010 105702 A3 | 9/2010 |
| WO | 2012 167820 A1 | 12/2012 |
| WO | WO 2013 169162 | 11/2013 |

OTHER PUBLICATIONS

PCT Written Opinion of the International Searching Authority for International application No. PCT/SE2014/051306—dated Oct. 1, 2015.
Supplementary European Search Report for Application No. / Patent No. 14905389.4-1875/3216151—dated Oct. 9, 2017.

\* cited by examiner

Uplink data transmisson

Downlink data transmisson

ADAPTIVE HARQ TIMING RELAXATION

PRIORTY

This nonprovisional application is a U.S. National Stage Filing under 35 U.S.C. § 371 of International Patent Application Serial No. PCT/SE2014/051306 filed Nov. 5, 2014, and entitled "*Adaptive HARQ Timing Relaxation.*"

TECHNICAL FIELD

The present disclosure is directed to a method and apparatus for controlling a Hybrid Automatic Repeat Request, HARQ, retransmission round-trip time for transmission in a wireless network.

BACKGROUND

3GPP Long Term Evolution, LTE, is the fourth-generation mobile communication technologies standard developed within the 3rd Generation Partnership Project, 3GPP, to improve the Universal Mobile Telecommunication System, UMTS, standard to cope with future requirements in terms of improved services such as higher data rates, improved efficiency, and lowered costs. In a typical cellular radio system, wireless devices also known as mobile stations and/or user equipment units, UEs, communicate via a radio access network, RAN, to one or more core networks. The Universal Terrestrial Radio Access Network, UTRAN, is the radio access network of a UMTS and Evolved UTRAN, E-UTRAN, is the radio access network of an LTE system. In an UTRAN and an E-UTRAN, a wireless device is wirelessly connected to a Radio Base Station, RBS, commonly referred to as a NodeB, NB, in UMTS, and as an evolved NodeB, eNB or eNodeB, in LTE. An RBS is a general term for a radio network node capable of transmitting radio signals to a wireless device and receiving signals transmitted by a wireless device.

An uplink transmission of a wireless device can, in general, be received at several base stations, although typically a single base station controls the uplink transmission of the wireless device.

State-of-the art wireless access systems typically employ an Automatic Repeat Request mechanism, e.g. a Hybrid Automatic Repeat Request (HARQ) mechanism to increase the spectral efficiency of the system. Such a mechanism uses feedback messages sent from the data receiver to a data sender in order to trigger retransmissions if the previous transmission failed.

In order to minimize the transmission cost and delays of the ARQ respectively HARQ feedback, state-of-the-art ARQ/HARQ mechanisms employ a fixed timing relation between the transmission of the signal (from the sender to the receiver) and the transmission of the ARQ/HARQ feedback (from the receiver to the sender). An example of this is the HARQ protocol in LTE as defined in the MAC protocol specification. HARQ timing for uplink is described in 3GPP TS 36.213 version 12.3.0 section 10.1. HARQ timing for downlink is not strict in LTE, but the maximum processing time under which both HARQ and full Transmission Time Interval, TTI, utilization can be achieved can be derived from the number of parallel HARQ processes which can be found in 3GPP TS 36.213, section 7, version 12.3.0. The HARQ retransmission protocol in Frequency Division Duplex, FDD, mode is designed for a round-trip time of 8 ms. For TDD the round trip time, RTT, depends on TDD configuration. For some TDD configurations the RTT can be different depending on HARQ process In LTE, it is also specified that the HARQ feedback needs to be sent after a certain number of Transmission Time Intervals, TTIs, or equivalent sub-frames. For LTE FDD the feedback needs to be sent 4TTIs after the transmission. This implies tight timing constraints for the uplink HARQ protocol operation. Achieving full throughput for one UE requires a processing latency of at most 3 ms on the network side, from the reception of an uplink signal until the transmission of a potential downlink response signal.

SUMMARY

It is an object of the present disclosure to provide mechanisms for relaxation of the HARQ timing constraints.

In particular, it is an object of the disclosure to enable a scenario based dynamic selection of one or more HARQ relaxation approaches.

This object is achieved by a method of controlling a Hybrid Automatic Repeat Request, HARQ, retransmission round-trip time for transmission in a wireless network, a network node and a computer readable storage medium having stored thereon a computer program run in the network node.

The disclosure presents a method of controlling a HARQ retransmission round-trip time, the method including the step of estimating one or more latency related transmission parameters. One or more of a plurality of predefined HARQ relaxation techniques are selected based on the estimated one or more latency related transmission parameters. The transmission is scheduled using the selected one or more HARQ relaxation techniques.

Use of the disclosed method provides for a relaxed network processing delay requirement while controlling the effect on performance because a HARQ relaxation technique is dynamically selected based on transmission conditions, e.g. cell load or channel quality. This is particularly beneficial for a scenario where several network nodes are involved in the processing for one wireless device, e.g. during centralized processing or multipoint transmission/reception.

According to an aspect of the disclosure, the method is performed when performing transmission in FDD-mode.

According to an aspect of the disclosure, the method is performed in a wireless access node arranged to schedule uplink and/or downlink transmission to a wireless device.

Implementation of the HARQ selection in the wireless access node responsible for scheduling transmission resources to and/or from a wireless device provides for a timely and responsive implementation.

According to an aspect of the disclosure, the plurality of predefined HARQ relaxation techniques comprises increasing a HARQ round-trip time by disabling HARQ retransmission. Further predefined HARQ relaxation techniques comprises to disable at least every other HARQ retransmission opportunity for each HARQ process; to postpone HARQ retransmission until receipt of explicit retransmission grant; and/or to alternate HARQ transmission between at least two transport blocks during a spatial multiplexing mode.

This aspect of the present disclosure improves the ability to introduce known HARQ relaxation techniques to improve performance during latency sensitive scenarios. The present disclosure also provides the benefit of enabling combination or reselection of HARQ relaxation techniques to provide for improved dynamics when implementing HARQ relaxation.

According to an aspect of the disclosure, the method comprises the step of determining if spatial multiplexing is available for the transmission. The selection of the one or more predefined HARQ relaxation techniques is based on the determined availability of spatial multiplexing and the estimated latency related transmission parameters.

Consequently, the dynamic selection of HARQ relaxation techniques is adaptable to the specific latency situation during multipoint transmission and/or reception.

According to an aspect of the disclosure, estimating channel quality comprises estimating an uplink channel quality. For uplink transmission, the step of selecting one or more of the plurality of predefined HARQ relaxation techniques comprises selecting to increase a HARQ round-trip time by disabling at least every other HARQ retransmission opportunity when the uplink channel quality is estimated to be below a predetermined SINR or when the uplink channel quality is estimated to be above the predetermined SINR while the uplink cell load is above a predefined high load.

According to another aspect of the disclosure, estimating cell load comprises estimating an uplink cell load. For uplink transmission, the step of selecting one or more of the plurality of predefined HARQ relaxation techniques comprises selecting to increase a HARQ round-trip time by disabling HARQ retransmission when the estimated uplink cell load is below a predefined low load and uplink channel quality is estimated to be above a predetermined SINR.

Addressing an uplink transmission scenario specifically by estimating uplink channel quality and/or uplink cell load, provides the ability of selecting a HARQ relaxation technique optimized for uplink transmission.

According to another aspect of the disclosure, estimating channel quality comprises estimating a downlink channel quality. For downlink transmission, the step of selecting one or more of the plurality of predefined HARQ relaxation techniques comprises selecting to increase a HARQ round-trip time by alternating HARQ retransmission between two spatially multiplexed transport blocks when the downlink cell load is below a predefined low load and the downlink channel quality is estimated to be above a predetermined SINR.

According to another aspect of the disclosure, estimating cell load comprises estimating a downlink cell load. For downlink transmission, the step of selecting one or more of the plurality of predefined HARQ relaxation techniques comprises selecting to increase a HARQ round-trip time by disabling at least every other HARQ retransmission opportunity when the downlink cell load is above a predefined high load.

Addressing a downlink transmission scenario specifically by estimating downlink channel quality and/or downlink cell load, provides the ability of selecting a HARQ relaxation technique optimized for downlink transmission, e.g. a HARQ relaxation technique benefiting from two transport blocks at downlink channel rank 2.

According to an aspect of the disclosure, the method is performed at each scheduling opportunity for the wireless device.

Selection and re-selection of HARQ relaxation techniques at each scheduling opportunity provides for close adherence between the selected relaxation techniques and current transmission situation.

The object of the disclosure is also achieved by a network node comprising processing means operative to control a Hybrid Automatic Repeat Request, HARQ, retransmission round-trip time for transmission in a wireless network. The processing means are adapted to estimate one or more latency related transmission parameters, select one or more of plurality of predefined HARQ relaxation techniques based on the estimated one or more latency related transmission parameters, and schedule transmission using the selected one or more HARQ relaxation techniques.

The object of the disclosure is also achieved by a network node comprising an estimation module configured to estimate one or more latency related transmission parameter(s), a selection module configured to select a predefined HARQ relaxation technique; and a scheduling module configured to schedule transmission using the selected HARQ relaxation technique.

The object of the disclosure is also achieved by a computer-readable storage medium, having stored thereon a computer program which, when run in a network node, causes the network node to perform the previously disclosed method.

The network node and the computer-readable storage medium each display advantages corresponding to advantages described for the corresponding method.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein. It should be appreciated that all of the example embodiments presented herein may be applicable to a UTRAN or E-UTRAN based system.

General Overview

In order to provide a better explanation of the example embodiments presented herein, a problem will first be identified and discussed.

Figure 1:
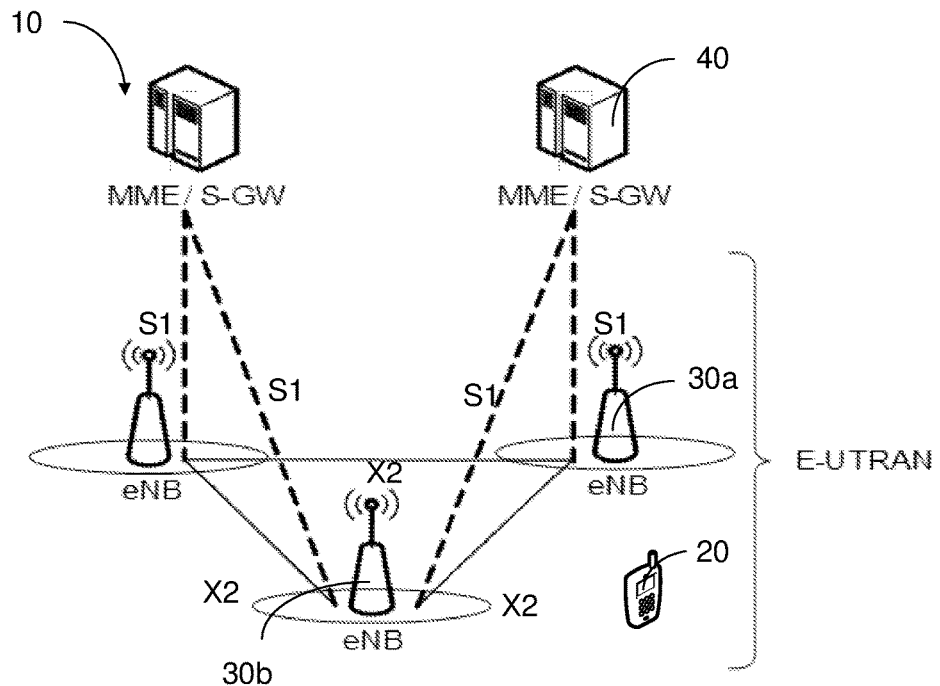
FIG. 1 Schematically discloses an exemplary environment of cooperating base stations in a LTE architecture.

FIG. 1 discloses an exemplary LTE wireless network 10. A wireless device, in the following also presented as a user equipment, UE, 20 is arranged for data transmission over an air interface to one or more base stations 30a and b, here illustrated as eNBs.

The LTE air interface is designed assuming strict requirements on processing delays. In particular, the HARQ retransmission protocol in Frequency Division Duplex, FDD, mode is designed for a round-trip time of 8 ms. Achieving full throughput for one UE requires a processing latency of at most 3 ms on the network side, from the reception of an uplink signal until the transmission of a potential downlink response signal. For transmission in Time Division Duplex, TDD, mode the round trip time, RTT, depends on TDD configuration. For some TDD configurations the RTT can be different depending on HARQ process.

The 3 ms latency requirement is challenging in scenarios where several network nodes are involved in the processing for one UE. Examples are centralized processing as well as multi-point transmission and/or reception. With a non-ideal transport network between the nodes in such scenarios, it may be impossible to achieve the 3 ms processing latency, thereby limiting the possibilities for centralized processing as well as multipoint transmission/reception.

Figure 2A:
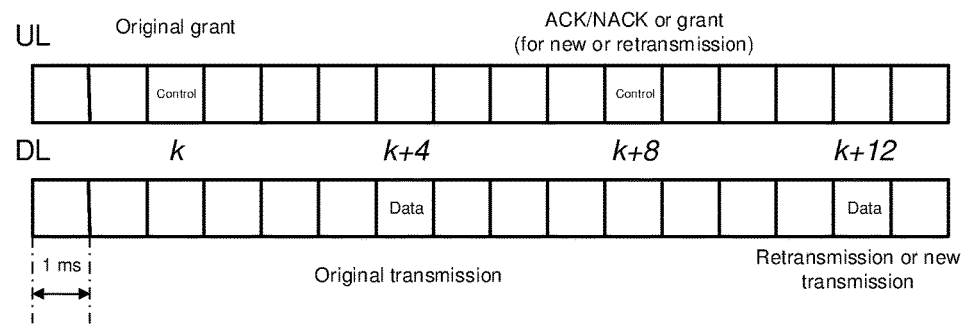
FIG. 2
a. schematically discloses a HARQ timing scheme for LTE FDD uplink;
b. schematically discloses a HARQ timing scheme for LTE FDD downlink.

FIG. 2a schematically discloses a HARQ timing scheme for LTE FDD uplink. In the uplink a retransmission is triggered by a NACK or an explicit grant.

Figure 2B:
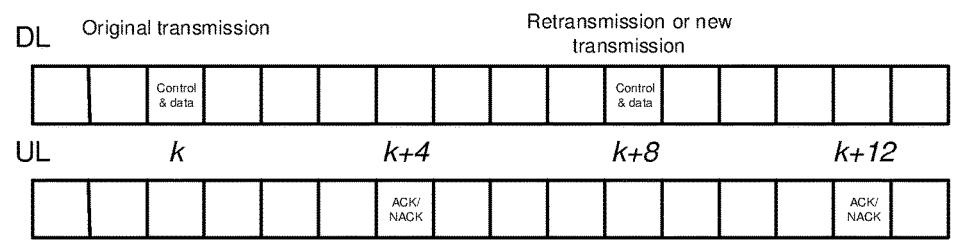

FIG. 2b schematically discloses a HARQ timing scheme for LTE FDD downlink. In the downlink, retransmission is triggered by a NACK.

Figure 3:
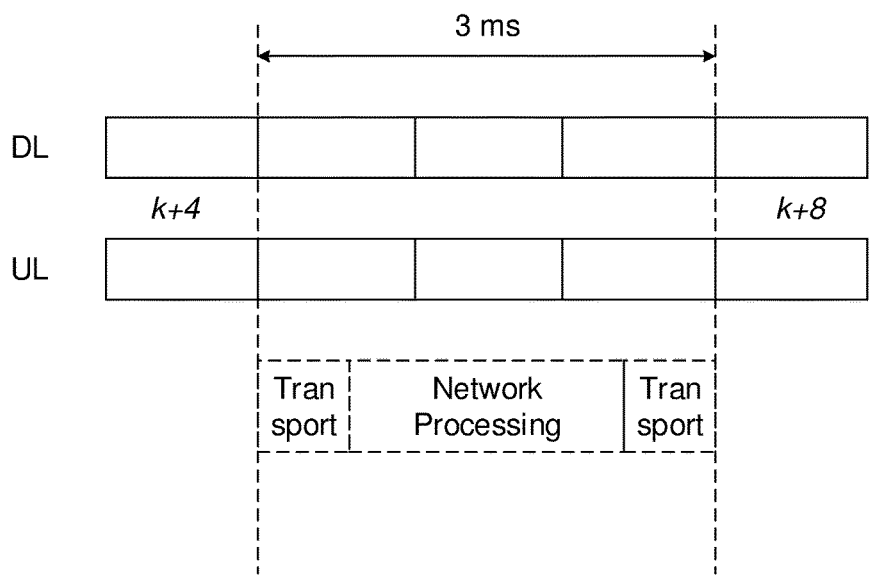
FIG. 3 schematically discloses network latency requirements for full throughput.

As is seen in FIGS. 2a and b, the HARQ retransmission protocol in FDD mode is designed for a round-trip time of 8 ms. Achieving full throughput for one UE requires a processing latency of at most 3 ms on the network side, as illustrated in FIG. 3, from the reception of an uplink signal until the transmission of a potential downlink response signal. Such latency includes at least uplink L1 processing, scheduling performed in the scheduling wireless access node, downlink L2 and L1 processing plus any other interconnect latencies. The air interface propagation delay is compensated at UE side and does not impact network latency requirements.

The 3 ms latency requirement is challenging in scenarios where several network nodes are involved in the processing for one UE. Examples are centralized processing as well as multi-point transmission and/or reception.

With a non-ideal transport network between the nodes in such scenarios, it may be impossible to achieve the 3 ms processing latency, thereby limiting the possibilities for centralized processing as well as multipoint transmission/reception.

A number of solutions have been developed to address the problem of latency recognized above. In the following, four different solutions will be presented. Each of these solutions exhibit different advantages and drawbacks.

A first known approach to reduce the problems of latency is to disable HARQ retransmissions and to completely rely on the Radio Link Control, RLC, layer to retransmit data lost in the physical layer.

A second approach includes skipping of sub-frames in the physical layer transmission. Since the response cannot be generated within the required latency, every second transmission opportunity is skipped for each HARQ process. The HARQ round-trip time is then increased to 16 ms, and the latency requirement is relaxed to 11 ms.

In a third approach, uplink Transmission Time Interval, TTI, bundling with explicit retransmission grants is used. Each uplink transmission is initially acknowledged by the network. If network processing later determines that a retransmission is needed, it is explicitly granted. The HARQ round-trip time is increased to 16 ms, and the latency requirement is relaxed to 8 ms.

In a fourth approach, HARQ transmission is alternated between at least two transport blocks in spatial multiplexing mode. Each transport block of a HARQ process is transmitted with a round-trip time of 16 ms, but each subframe is used because there are two transport blocks available per HARQ process.

Each of the disclosed approaches implies advantages and drawbacks depending on the scenario. In some scenarios, use of one or more of the above presented approaches can cause serious performance degradation. Thus, this disclosure proposes a scenario based solution enabling dynamic selection of one or more HARQ relaxation approaches, such as the ones listed in the previous section.

Figure 4:
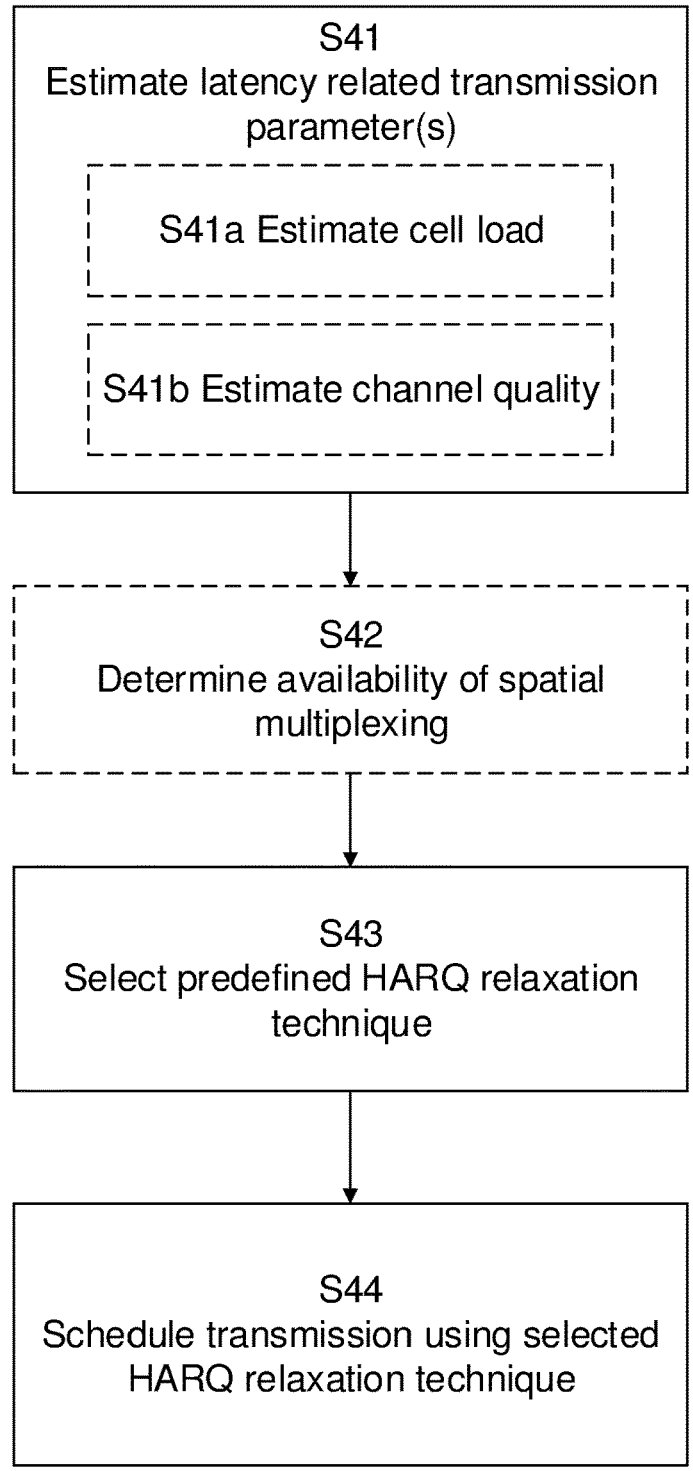
FIG. 4 is a flow chart schematically illustrating embodiments of method steps performed in the dynamic selection of HARQ relaxation techniques.

FIG. 4 is a flow chart schematically illustrating embodiments of method steps performed, e.g. in a wireless access node scheduling transmission to/from a wireless device in a wireless network, for the dynamic selection of HARQ relaxation techniques. The method is exemplified for FDD-transmission, but is also applicable to TDD-transmission.

Figure 8:
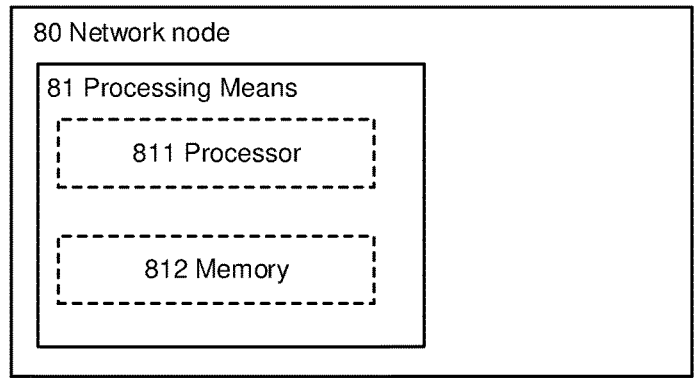
FIG. 8 is a block diagram schematically illustrating an embodiment of a network node arranged to perform a dynamic selection of HARQ relaxation techniques.

According to an aspect of the disclosure, the method is performed in a wireless access node arranged to schedule uplink and/or downlink transmission to a wireless device, e.g. the network node of FIG. 8. It is also possible to perform the method in other network nodes in a wireless network, in a combination of network nodes or partly in the wireless access node and partly in other entities or functions in the access network, core network or cloud.

In a first step S41, one or more latency related transmission parameters are estimated. According to an aspect of the disclosure, such latency related transmission parameters include cell load, and channel quality in transmission to/from a wireless device. In optional steps S41a and b, cell load and channel quality is estimated. Other known latency related parameters include channel rank for the latency sensitive connection.

One or more of a plurality of predefined HARQ relaxation techniques is selected in step S43 based on the estimated one or more latency related transmission parameters. The predefined HARQ relaxation techniques include e.g. the above presented approaches for HARQ relaxation, but could also include other HARQ relaxation techniques yet to be developed.

For uplink, an exemplary selection of predefined HARQ relaxation techniques based on an estimate of channel quality and cell load, is presented in the below table.

TABLE 1

Uplink, no spatial multiplexing

|  | Low load | Medium or varying load | Consistently high load(*) |
|---|---|---|---|
| Low-medium SINR | Skip sub-frames | Skip sub-frames | Skip sub-frames |
| High SINR | Disable HARQ | Disable HARQ/ Skip sub-frames | Skip sub-frames |

In the downlink, an exemplary selection of predefined HARQ relaxation could also be based on channel rank, i.e. to what extent spatial multiplexing is available for the transmission, in addition to channel quality and cell load.

TABLE 2

Downlink, spatial multiplexing

|  | Low load | Medium or varying load | Consistently high load(*) |
|---|---|---|---|
| Rank 1 channel | Single code word | Single code word | Single code word |
| Rank 2 channel Low-medium SINR | Single code word | Single code word/ Two code words | Two code words Skip sub-frames |
| Rank 2 channel High SINR | Two code words Disable HARQ | Two code words Disable HARQ/ Skip sub-frames | Two code words Skip sub-frames |

In a concluding step S44, transmission to/from a wireless device is scheduled using the selected one or more HARQ relaxation techniques.

According to a further aspect, the plurality of predefined HARQ relaxation techniques comprises increasing a HARQ round-trip time by disabling HARQ retransmission;

disabling at least every other HARQ retransmission opportunity for each HARQ process; represented as skipping sub-frames in the tables above.

postponing HARQ retransmission until receipt of explicit retransmission grant; and/or alternating HARQ transmission between at least two transport blocks during a spatial multiplexing mode, represented as using single code word in the tables above.

According to an aspect of the disclosure, the method also includes the optional step S42 of determining if spatial multiplexing is available for the transmission, e.g. by determining channel rank. In the following step S43, the selecting of one or more predefined HARQ relaxation techniques is based on a combination of the determined availability of spatial multiplexing and the estimated latency related transmission parameters.

Overview of Example Embodiments

As presented for FIG. 4, it is a general principle of the disclosure to control a HARQ retransmission round-trip time for FDD-mode transmission by selecting one or more of a plurality of predefined HARQ relaxation techniques based on determined channel properties.

Such predefined HARQ relaxation techniques include the following prior art HARQ relaxation techniques:

Disabling HARQ

When HARQ is disabled, no HARQ retransmissions are performed/requested, and all sub-frames are available for scheduling.

Skipping sub-frames

Every second transmission opportunity is skipped for each HARQ process. The HARQ round-trip time is then increased to 16 ms and the latency requirement is relaxed to 11 ms.

Using TTI bundling with explicit retransmission grants

Each uplink transmission is initially ACKed by the network. If network processing later determines that a retransmission is needed, it is explicitly granted. The HARQ round-trip time is increased to 16 ms and the latency requirement is relaxed to 8 ms.

Alternating between at least two transport blocks in spatial multiplexing modes.

Each transport block of a HARQ process is transmitted with a round-trip time of 16 ms, but each sub-frame is used because there are transport blocks available per HARQ process.

As further HARQ relaxations techniques evolve, it is within the scope of the present disclosure to include these in the selection group of predefined HARQ relaxation techniques. Consequently, even though specifically exemplified below with regard to the four relaxation techniques listed above, the present disclosure also encompasses selection of further HARQ relaxation techniques.

Furthermore, in the examples presented below, one HARQ relaxation techniques has been selected and put to use in the disclosed uplink and downlink FDD transmissions. However, it is also within the scope of the present disclosure to use a combination of relaxation techniques. Such combinations would then be handled as further predefined HARQ relaxation techniques that are eligible for selection.

In the following examples, it is assumed that spatial multiplexing is available in the downlink but not in the uplink. However, scenarios where spatial multiplexing is available also in the uplink or only in the uplink are also within the scope of the present disclosure.

Uplink FDD Transmissions

Figure 5:
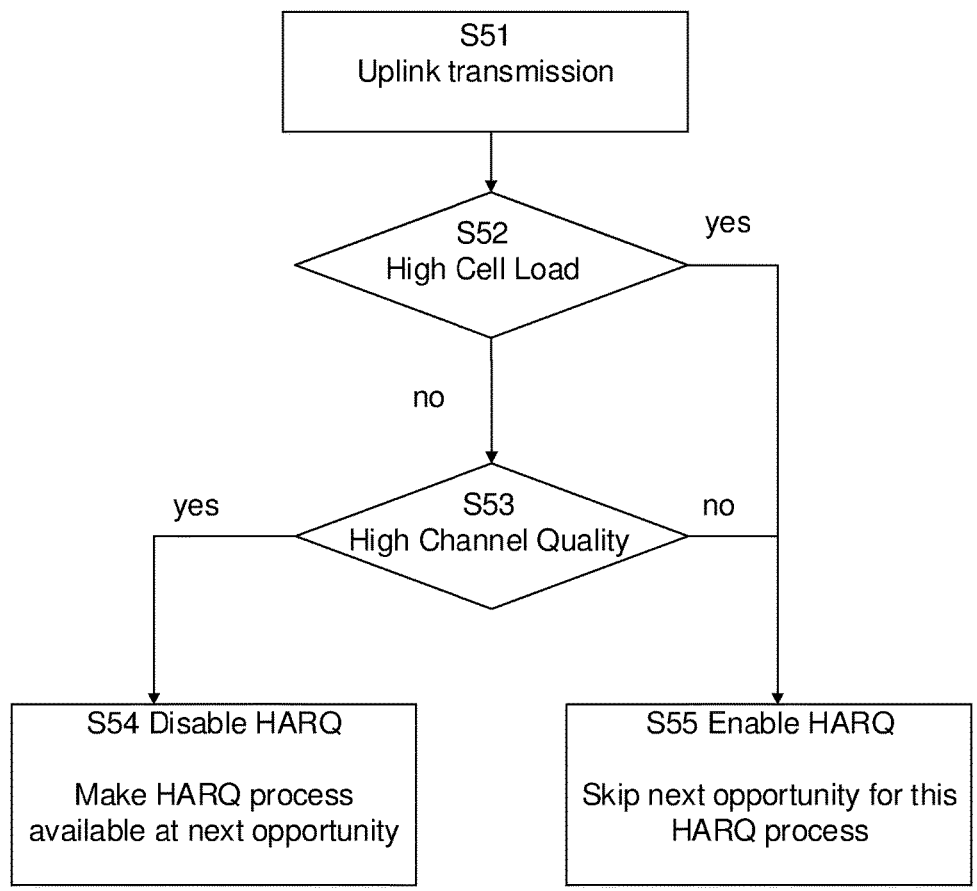
FIG. 5 is a flow chart schematically illustrating embodiments of method steps performed in the dynamic selection of HARQ relaxation techniques for uplink FDD transmissions.

FIG. 5 discloses an example of selection of a HARQ relaxation technique for uplink transmission, performed in a scheduling node, e.g. an eNodeB, a radio base station or a wireless access node; scheduling a UE for transmission of a new uplink transport block in subframe k.

As a starting point in step S51, it is concluded that transmission is an uplink transmission. In steps S52 and S53 the latency related transmission parameters of cell load and channel quality are estimated.

In step S52 the uplink cell load is estimated. The estimate can be instantaneous or it can be filtered over time. The estimate can be based on the number of waiting UEs in a subframe. These are the UEs that could have been scheduled, but that were not because other UEs were scheduled instead. The number of waiting UEs can be normalized by dividing with the number of scheduled UEs. The cell load is considered low if it is below a threshold.

If cell load is high, above a predetermined threshold limit, the HARQ relaxation technique to skip the next transmission opportunity is selected in step S55, i.e. the previously disclosed relaxation technique of skipping every second transmission opportunity for each HARQ process. The HARQ round-trip time is then increased to 16 ms and the latency requirement is relaxed to 11 ms. Following selection of the HARQ relaxation technique, scheduling is performed as previously discussed for FIG. 4. If cell load is found to be low in step S52, the uplink channel quality is estimated in step S53. The estimate is based on estimated achievable SINR (signal-to-noise and interference ratio) for a given resource allocation. This is, in turn, based on measured received signal power from the UEs, measured interference, and power headroom reports. The uplink channel quality is considered high if it is above a threshold.

When the uplink cell load is determined not to be high and the uplink channel quality is high, HARQ is disabled for the uplink transmission in step S54. Disabling HARQ implies the following:
- i. (Optional step) Adjust link adaptation to target a relatively low error probability, as compared to transmissions with HARQ. This can be done by choosing a relatively low MCS (modulation and coding scheme), and/or by choosing a relatively high transmission power.
- ii. Mark the HARQ process as available for scheduling of a new transmission at the next transmission opportunity, in subframe k+8.
- iii. Transmit and ACK on the PHICH to the UE in subframe k+4 in response to the uplink transmission, unless a new transmission is scheduled for the next transmission opportunity (subframe k+8).

When the uplink cell load is determined not to be high, below a predetermined threshold limit, and the uplink channel quality is determined not to be high, HARQ is enabled in step S55 and the previously discussed relaxation technique to skip sub-frames is used; i.e. to skip the next transmission opportunity. An exception is when the maximum number of HARQ retransmissions has been reached in which case the HARQ process can be used in the immediately following transmission opportunity.

Scheduling a UE for HARQ transmission in subframe k implies the following:
- a. Estimate the error probability of this retransmission.
- b. If this is the last retransmission opportunity for this transport block, or if the estimated error probability is below a threshold:
  - i. Mark the HARQ process as available for scheduling of a new transmission at the next transmission opportunity, in subframe k+8.
  - ii. Transmit and ACK on the PHICH to the UE in subframe k+4 in response to the uplink transmission, unless a new transmission is scheduled for the next transmission opportunity (subframe k+8).
- c. Otherwise
  - i. Adjust link adaptation to target a normal error probability.
  - ii. Transmit an ACK on the PHICH to the UE in subframe k+4 in response to the uplink transmission.
  - iii. If the decoding of the transport block is successful, mark the HARQ process as available for scheduling of a new transmission in subframe k+16.
  - iv. If the decoding of the transport block is not successful, mark the HARQ process as available for retransmission in subframe k+16.

Following selection of the HARQ relaxation technique, scheduling is performed as previously discussed for FIG. 4. According to an aspect of the disclosure, the disclosed method is performed at each scheduling opportunity for the wireless device.

Downlink FDD Transmissions

Figure 6:
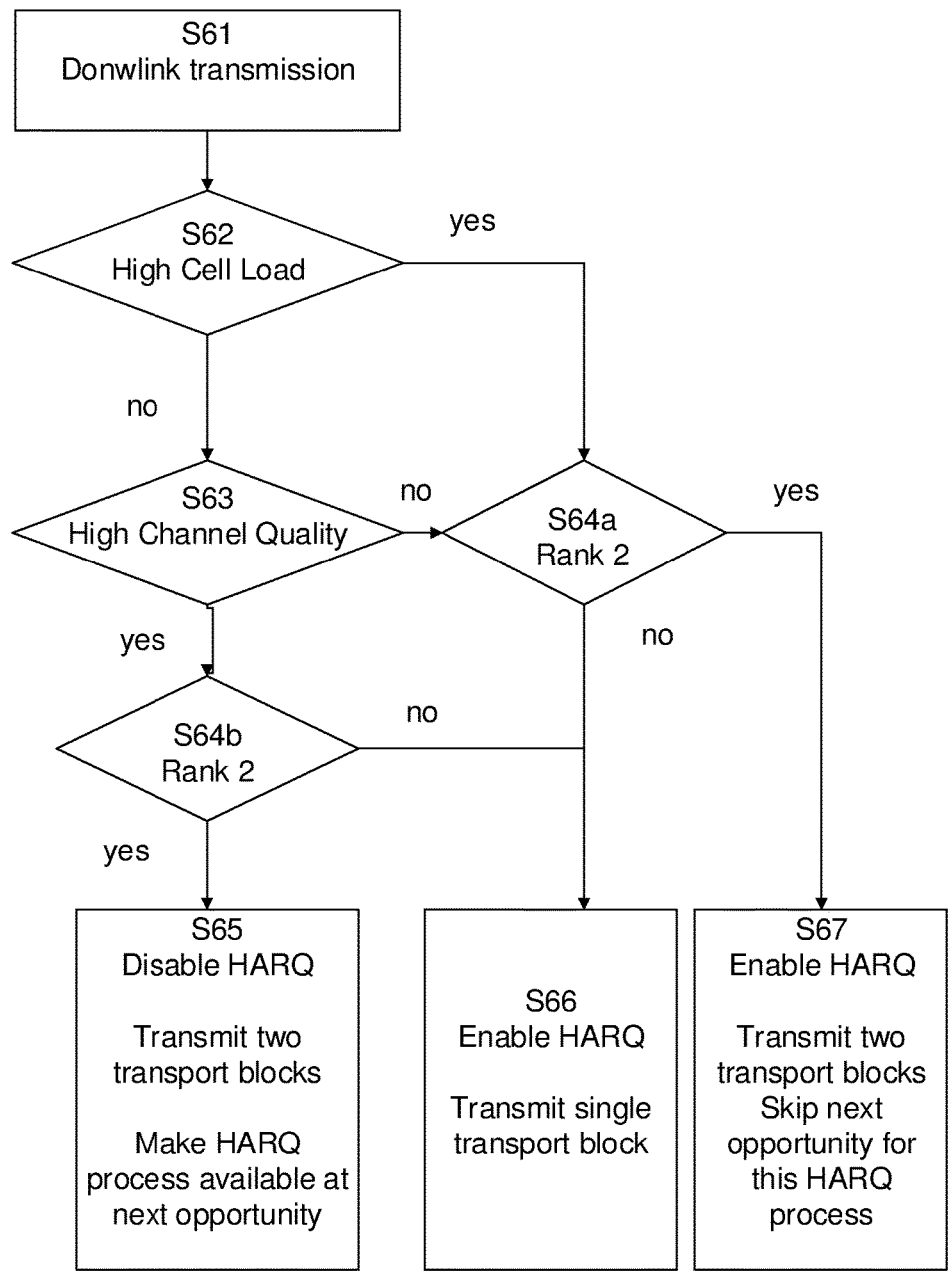
FIG. 6 is a flow chart schematically illustrating embodiments of method steps performed in the dynamic selection of HARQ relaxation techniques for downlink FDD transmissions.

FIG. 6 discloses an example of selection of a HARQ relaxation technique for downlink FDD transmission, performed in a scheduling node, e.g. an eNodeB, a radio base station or a wireless access node; scheduling a downlink transmission in subframe k using a HARQ process where two transport blocks are available for new transmissions.

In the following example for downlink transmissions, we assume a HARQ round-trip time of 16 sub-frames, meaning that for a transmission in subframe k, followed by UE feedback for that transmission, the earliest opportunity for a transmission based on that feedback (whether a retransmission or new transmission) is in subframe k+16.

As a starting point in step S61, it is concluded that the transmission is an uplink transmission. In steps S62 and S63 the latency related transmission parameters of cell load and channel quality are estimated.

In step S62 the downlink cell load is estimated. The estimate is instantaneous or filtered over time. The estimate can be based on the number of waiting UEs in a subframe. These are the UEs that could have been scheduled, but that were not because other UEs were scheduled instead. The number of waiting UEs can be normalized by dividing with the number of scheduled UEs. The cell load is considered low if it is below a threshold.

In step S63, a downlink channel quality is estimated. The estimate is based on estimated achievable SINR (signal-to-noise and interference ratio) for a given resource allocation. This is, in turn, based on measured received signal power from the UEs, measured interference, and power headroom reports. The uplink channel quality is considered high if it is above a threshold.

In steps S64a and b, a channel rank is estimated. The estimate may be based on the CSI reports sent from the UEs as well as received HARQ ACK/NACKs from the UE.

When the downlink cell load is determined not to be high, the downlink channel quality is high and the rank is 2, HARQ is disabled for the downlink transmission in step S65. The two transport blocks are scheduled with HARQ disabled. Transmission of the two transport blocks when disabling HARQ implies the following:
- i. (Optional step) Adjust link adaptation to target a relatively low error probability, as compared to transmissions with HARQ. This can be done by choosing a relatively low MCS (modulation and coding scheme), and/or by choosing a relatively high transmission power.
- ii. Mark the HARQ process as available for scheduling of a new transmission in subframe k+8.
- iii. Ignore any ACK/NACKs received from the UE for the transmission.

When the downlink cell load is determined not to be high in step S62 or the downlink channel is determined not to support rank 2 in step S64b, HARQ is enabled in step S66 using scheduling with a single transport block transmitted as follows:
- i. Adjust link adaptation to target a normal probability of error.
- ii. Monitor ACK/NACKs received from the UE in subframe k+4 for the transmission.
- iii. Consider subframe k+8 as the earliest opportunity for transmission (new transmission or retransmission) on this HARQ process.

When the downlink cell load is determined to be high and the downlink channel rank is 2, scheduling is performed with HARQ enabled in step S67 using transmission with two transport blocks as follows:
- i. Adjust link adaptation to target a normal probability of error.
- ii. Monitor ACK/NACKs received from the UE in subframe k+4 for the transmission.
- iii. Consider subframe k+16 as the earliest opportunity for transmission (new transmission or retransmission) on this HARQ process.

Following selection of the HARQ relaxation technique, scheduling is performed as previously discussed for FIG. 4. According to an aspect of the disclosure, the disclosed method is performed at each scheduling opportunity for the wireless device.

Figure 7:
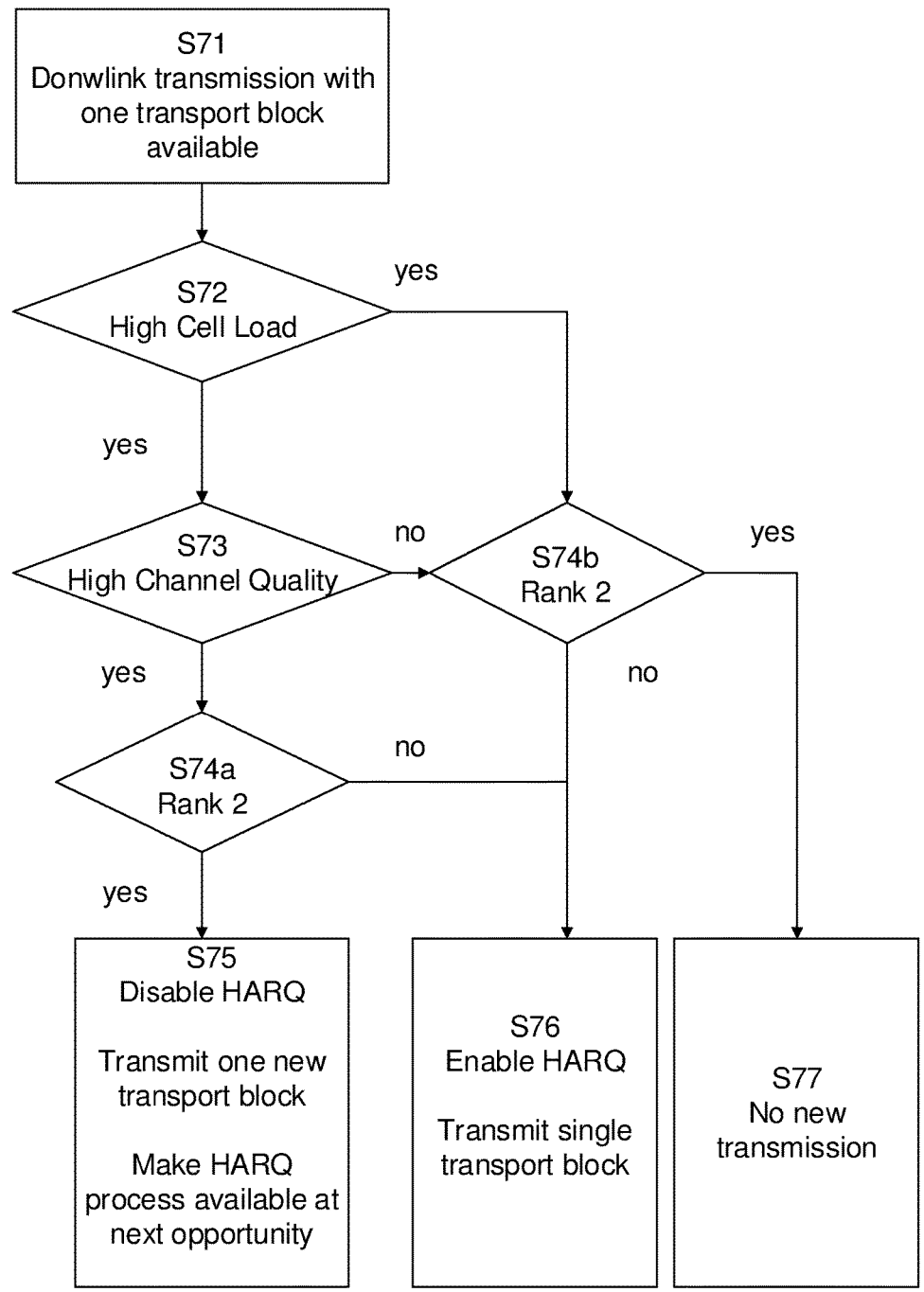
FIG. 7 is a flow chart schematically illustrating embodiments of method steps performed in the dynamic selection of HARQ relaxation techniques for downlink FDD transmissions.

FIG. 7 discloses an example of selection of a HARQ relaxation technique for a downlink FDD transmission; when scheduling a downlink transmission in subframe k using a HARQ process where one transport block is available for new transmissions.

In the following example for downlink transmissions, we assume a HARQ round-trip time of 16 sub-frames, meaning that for a transmission in subframe k, followed by UE feedback for that transmission, the earliest opportunity for a transmission based on that feedback (whether a retransmission or new transmission) is in subframe k+16.

As a starting point in step S71, it is concluded that the transmission is an uplink transmission. In steps S72 and S73 the latency related transmission parameters of cell load and channel quality are estimated.

In step S72 the downlink cell load is estimated. The estimate is instantaneous or filtered over time. The estimate can be based on the number of waiting UEs in a subframe. These are the UEs that could have been scheduled, but that were not because other UEs were scheduled instead. The number of waiting UEs can be normalized by dividing with the number of scheduled UEs. The cell load is considered low if it is below a threshold.

In step S73, a downlink channel quality is estimated. The estimate is based on estimated achievable SINR (signal-to-noise and interference ratio) for a given resource allocation. This is, in turn, based on measured received signal power from the UEs, measured interference, and power headroom reports. The uplink channel quality is considered high if it is above a threshold.

In steps S74*a* and *b*, a channel rank is estimated. The estimate can be based on the CSI reports sent from the UEs as well as received HARQ ACK/NACKs from the UE.

When the downlink cell load is determined not to be high, the downlink channel quality is high and the rank is 2, HARQ is disabled for the downlink transmission in step S75. A single transport block with HARQ disabled is scheduled as follows:
  i. Adjust link adaptation to target a relatively low error probability, as compared to transmissions with HARQ. This can be done by choosing a relatively low MCS (modulation and coding scheme), and/or by choosing a relatively high transmission power.
  ii. Mark the HARQ process as available for scheduling of a new transmission in subframe k+8.
  iii. Ignore any ACK/NACKs received from the UE for the transmission.

When the down link cell load is low or the downlink channel has rank 1, HARQ Otherwise, if the downlink cell load is low or the downlink channel has rank is 1, schedule a single transport block with HARQ enabled, as follows.
  i. Adjust link adaptation to target a normal probability of error.
  ii. Monitor ACK/NACKs received from the UE in subframe k+4 for the transmission.
  iii. Consider subframe k+8 as the earliest opportunity for transmission (new transmission or retransmission) on this HARQ process.

Following selection of the HARQ relaxation technique, scheduling is performed as previously discussed for FIG. 4. According to an aspect of the disclosure, the disclosed method is performed at each scheduling opportunity for the wireless device.

Example Node Configurations

FIG. 8 is a block diagram schematically illustrating an exemplary network node 80 arranged to perform a dynamic selection of HARQ relaxation techniques. The network node 80 comprises processing means 81 operative to control a Hybrid Automatic Repeat Request, HARQ, retransmission round-trip time for FDD-mode transmission in a wireless network. The processing means 81 is further adapted to estimate one or more latency related transmission parameters, select one or more of plurality of predefined HARQ relaxation techniques based on the estimated one or more latency related transmission parameters; and schedule the FDD-mode transmission using the selected one or more HARQ relaxation techniques.

According to an aspect of the disclosure, the processing means comprises a processor 811 and a memory 812, wherein said memory 821 is containing instructions executable by said processor 811.

According to a further aspect of the disclosure, the network node is a wireless access node, e.g. an eNB, arranged to schedule uplink and/or downlink transmission to a wireless device in the wireless network of FIG. 1.

Figure 9:
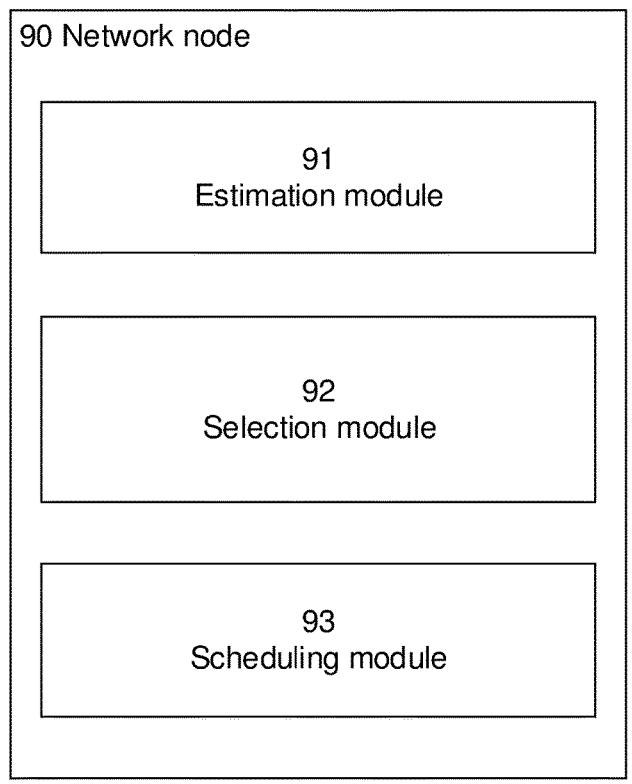
FIG. 9 is a block diagram schematically illustrating an embodiment of a network node arranged to perform a dynamic selection of HARQ relaxation techniques.

FIG. 9 is block diagram schematically illustrating an exemplary network node 90 arranged to perform a dynamic selection of HARQ relaxation techniques. The network node comprises one or several of
  an estimation module 91 configured to estimate one or more latency related transmission parameter(s),
  a selection module 92 configured to select a predefined HARQ relaxation technique, and
  a scheduling module 93 configured to schedule FDD-mode transmission using the selected HARQ relaxation technique.

The modules 91, 92 and 93 are implemented in hardware or in software or in a combination thereof. The modules 91-93 are according to one aspect implemented as a computer program stored in a memory which runs on a processor, e.g. the memory and processor disclosed for FIG. 8. The network node 90 is further configured to implement all the aspects of the disclosure as described in relation to the methods above.

Figure 10:
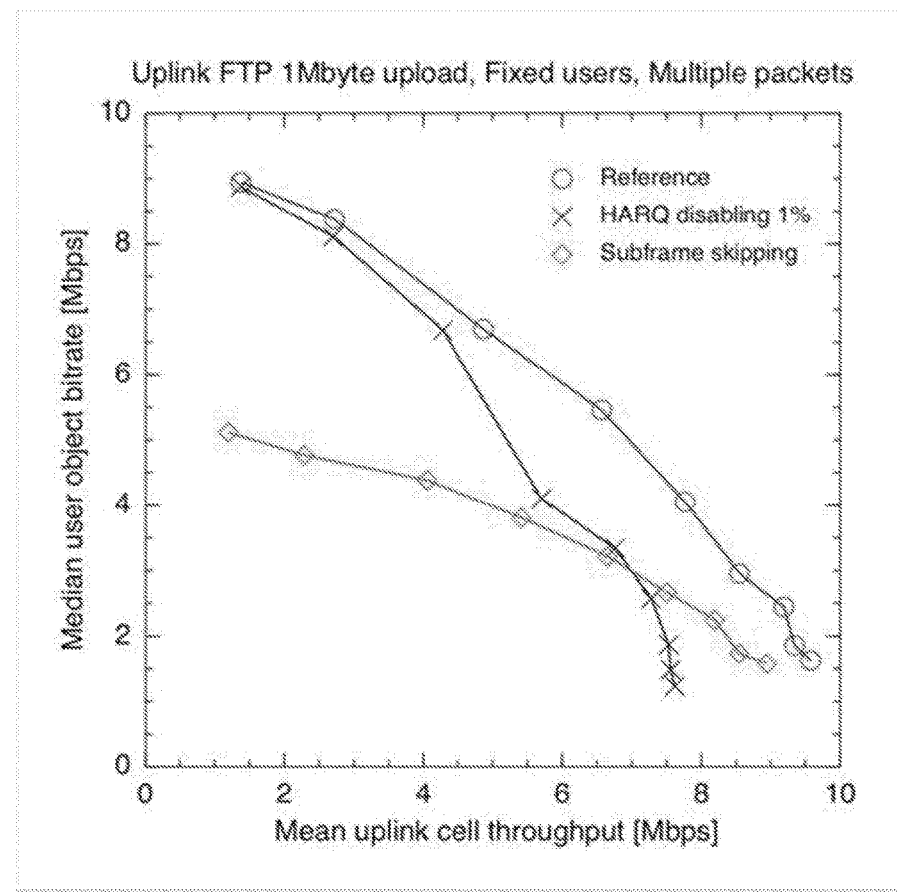
FIG. 10 is a simulated result from mode selection between sub-frame skipping and disabling HARQ for uplink FDD transmission.

FIG. 10 discloses a simulated result for cell throughput and user object bitrate when using the HARQ relaxation technique of subframe skipping and the technique of disabling HARQ. For low load the curve for disabling HARQ (crosses) is better than subframe skipping (diamonds), while for high load subframe skipping is better. Hence, the ability to switch between two procedures depending based on one or more estimated latency related transmission parameters, will provide the benefit of a better overall performance than either of the two methods on their own.

It should be noted that although terminology from 3GPP LTE has been used herein to explain the example embodiments, this should not be seen as limiting the scope of the example embodiments to only the aforementioned system. Alternative or future wireless systems, including WCDMA, HSDPA and EUL, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A device or user equipment as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. It should be appreciated that the term user equipment may also comprise any number of connected devices. Furthermore, it should be appreciated that the term 'user equipment' shall be interpreted as defining any device which may have an internet or network access.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

ABBREVIATIONS

ARQ Automatic Repeat reQuest
CoMP Coordinated Multi-Point
EUL Enhanced Uplink
E-UTRAN Evolved UTRAN
eNB eNodeB
FDD Frequency Division Duplex
HARQ Hybrid ARQ
HSDPA High-Speed Downlink Packet Access
LTE Long Term Evolution
MAC Medium Access Control
NDI New Data Indicator
PDCCH Physical Downlink Control Channel
PHICH Physical HARQ Indicator Channel
RB Resource Block
TDD Time Division Duplex
TTI Transmission Time Interval
UE User Equipment
UTRAN Universal Terrestrial Radio Access Network
WCDMA Wideband Code-Division Multiple Access

The invention claimed is:

1. A method of controlling a Hybrid Automatic Repeat Request, HARQ, retransmission round-trip time for transmission in a wireless network, the method comprising:
   estimating one or more latency related transmission parameters;
   selecting one or more of a plurality of predefined HARQ relaxation techniques based on the estimated one or more latency related transmission parameters; and
   scheduling transmission using the selected one or more HARQ relaxation techniques;
   wherein the method further comprises:
   determining if spatial multiplexing is available for the transmission; and
   selecting one or more predefined HARQ relaxation techniques based on the determined availability of spatial multiplexing and the estimated latency related transmission parameters.

2. The method of claim 1, wherein the transmission is an FDD-mode transmission.

3. The method of claim 1, wherein the method is performed in a wireless access node arranged to schedule uplink and/or downlink transmission to a wireless device.

4. The method of claim 1, wherein the plurality of predefined HARQ relaxation techniques comprises increasing a HARQ round-trip time by:
   disabling HARQ retransmission;
   disabling at least every other HARQ retransmission opportunity for each HARQ process;
   postponing HARQ retransmission until receipt of explicit retransmission grant; and/or
   alternating HARQ transmission between at least two transport blocks during a spatial multiplexing mode.

5. The method of claim 4, wherein estimating the one or more latency related transmission parameters comprises:
   estimating cell load; and
   estimating channel quality.

6. The method of claim 5, wherein estimating channel quality comprises estimating an uplink channel quality and wherein selecting one or more of the plurality of predefined HARQ relaxation techniques comprises selecting to increase a HARQ round-trip time by disabling at least every other HARQ retransmission opportunity when the uplink channel quality is estimated to be below a predetermined signal-to-noise and interference ratio (SINR) or when the uplink channel quality is estimated to be above the predetermined SINR while the uplink cell load is above a predefined high load.

7. The method of claim 6, wherein estimating cell load comprises estimating an uplink cell load and wherein selecting one or more of the plurality of predefined HARQ relaxation techniques comprises selecting to increase a HARQ round-trip time by disabling HARQ retransmission when the estimated uplink cell load is below a predefined low load and uplink channel quality is estimated to be above a predetermined SINR.

8. The method of claim 5, wherein estimating channel quality comprises estimating a downlink channel quality and wherein selecting one or more of the plurality of predefined HARQ relaxation techniques comprises selecting to increase a HARQ round-trip time by alternating HARQ retransmission between two spatially multiplexed transport blocks when the downlink cell load is below a predefined low load and the downlink channel quality is estimated to be above a predetermined signal-to-noise and interference ratio (SINR).

9. The method of claim 5, wherein estimating cell load comprises estimating a downlink cell load and wherein selecting one or more of the plurality of predefined HARQ relaxation techniques comprises selecting to increase a HARQ round-trip time by disabling at least every other HARQ retransmission opportunity when the downlink cell load is above a predefined high load.

10. The method according to claim 1, wherein the method is performed at each scheduling opportunity for the wireless device.

11. The method of claim 7, wherein estimating cell load comprises estimating an average cell load filtered over time.

12. The method of claim 5, wherein estimating channel quality comprises estimating an achievable signal-to-noise and interference ratio (SINR) for a given resource allocation.

13. A network node comprising:
a processor operative to control a Hybrid Automatic Repeat Request, HARQ, retransmission round-trip time for transmission in a wireless network, the processor further adapted to:
estimate one or more latency related transmission parameters;
select one or more of plurality of predefined HARQ relaxation techniques based on the estimated one or more latency related transmission parameters; and
schedule transmission using the selected one or more HARQ relaxation techniques;
wherein the processor further adapted to:
determine if spatial multiplexing is available for the transmission; and
select one or more predefined HARQ relaxation techniques based on the determined availability of spatial multiplexing and the estimated latency related transmission parameters.

14. The network node of claim 13, further comprising a memory, wherein said memory contains instructions executable by said processor.

15. The network node of claim 14, wherein the network node is a wireless access node arranged to schedule uplink and/or downlink transmission to a wireless device.

16. A network node comprising:
a processor; and
a memory coupled to the processor and storing program code that when executed by the processor cause the processor to:
estimate one or more latency related transmission parameter(s);
select a predefined HARQ relaxation technique; and
schedule transmission using the selected HARQ relaxation technique;
wherein the processor further adapted to:
determine if spatial multiplexing is available for the transmission; and
select one or more predefined HARQ relaxation techniques based on the determined availability of spatial multiplexing and the estimated latency related transmission parameters.

17. The network node of claim 16, wherein the network node is a wireless access node arranged to schedule uplink and/or downlink transmission to a wireless device.

18. A non-transitory computer-readable storage medium, having stored thereon a computer program which, when run in a network node, causes the network node to perform the method as disclosed in claim 1.

* * * * *